May 16, 1967  J. H. LEMELSON  3,320,338
PARTICLE MANUFACTURE
Filed Oct. 22, 1965

INVENTOR
JEROME H. LEMELSON

United States Patent Office 3,320,338
Patented May 16, 1967

3,320,338
PARTICLE MANUFACTURE
Jerome H. Lemelson, 85 Rector St.,
Metuchen, N.J. 08840
Filed Oct. 22, 1965, Ser. No. 501,393
8 Claims. (Cl. 264—14)

This invention relates to an apparatus and a method for making particulate material and is a continuation-in-part of copending application Ser. No. 347,524 filed on Feb. 26, 1964, for Fluid Processing Apparatus and Method and having a parent application Ser. No. 668,561 filed June 27, 1957, now Patent 3,227,642. In particular, this invention relates to the manufacture of particulate material such as metal particles, by spraying or ejecting same from a molten state into a wall or curtain of liquid, such as water, which is in constant motion.

It is known in the art to fabricate particulate material, such as metal powders, by generating a stream of droplets of metal and ejecting same into a water bath. Such a method has certain shortcomings including the necessary procedure of terminating the process when a certain amount of particulate material has collected in the bath, until the collection of particles has been removed from the container of liquid. Furthermore, since the particles produced by such a technique settle at the bottom of the liquid, they will pile up one on top of the other and may stick together as the result of compaction of said particles or become bonded together particularly in the upper strata of each batch produced. Various other shortcomings are also present when metal is sprayed into a container of liquid and the resulting particles are allowed to accumulate.

Accordingly, it is a primary object of this invention to provide a new and improved apparatus and method for fabricating particulate material of metal, non-metallic compounds, ceramics, glass and other material.

Another object is to provide a new and improved apparatus and method for continuously making particles from a supply of molten or semi-molten material.

Another object is to provide an improved apparatus for making metal powders, shot and the like without accumulating same until the particle has substantially completely solidified so that the particles will not molecularly bond together.

Another object is to provide an apparatus for making particles of material from a hot molten state by spraying droplets of same into a liquid which is in constant motion and is replenished at a substantially constant temperature and carries the formed particles along the stream thereof so that constant and heat transfer conditions may be derived to provide a uniform particle.

In accordance with this invention, metal such as aluminum, copper, steel or other element or compounds thereof or other materials such as ceramics, glass, polymers or the like is first heated to a semi-molten or molten condition and is fed continuously to means, such as a multi-stream generating spray nozzle, for providing said metal in droplet or particulate form and spraying same into a wall of water generated thereabout in an apparatus which includes means for introducing said water as a steady flow to a cylindrical wall surrounding the nozzle and rotating said cylindrical wall so as to form a substantially cylindrical wall of water which extends along the wall to an exit downstream of the spray nozzle. Since the particulate material formed in the wall of water is carried a substantial distance downstream before it is collected exterior of the rotating apparatus, it has an opportunity to substantially reduce in temperature and form solid particles which will not molecularly bond to each other as may particles disposed one above the other immediately after they are formed. The process is continuous and the apparatus may be applicable for the production of a variety of particles of different materials, shape and size depending on the characteristics of the material being sprayed, the spray equipment, and the operation of the means for generating and flowing the wall of liquid into which the material is sprayed.

With the above and such other objects in view as may hereafter more fully appear, the invention consists of the novel constructions, combinations and arrangements of parts as will be more fully described in the accompanying drawings but it is to be understood that changes, variations and modifications may be resorted to which fall within the scope of the invention as claimed:

Figure 1:
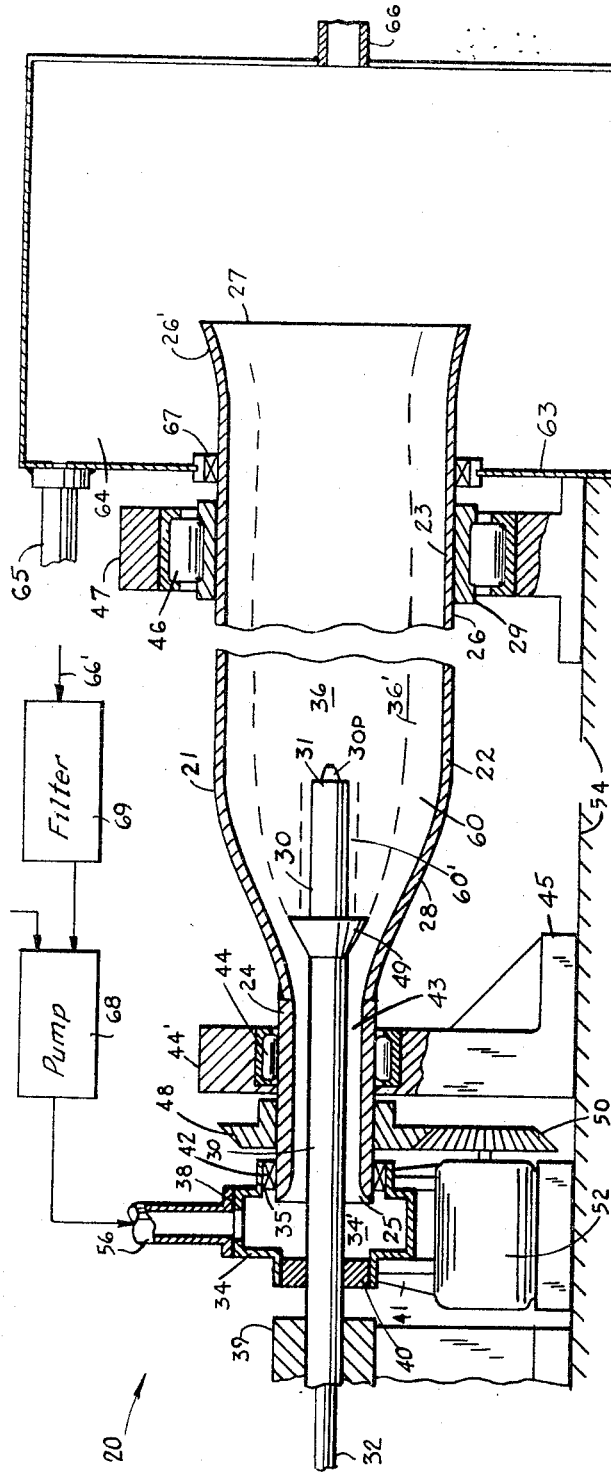
FIG. 1 is a side view, with parts broken away for clarity of an apparatus operative for producing particles from a variety of different materials.

In FIG. 1 is shown fluid processing apparatus employing a liquid introduced into a reaction chamber as a heat transfer medium operative to maintain the temperature of the wall of the apparatus relatively low enough to prevent damage or destruction thereto during the generation of high temperatures within the reaction chamber. The heat transfer liquid may take part in the reaction or may be used primarily for heat transfer purposes per se depending on the type of reaction and the components thereof.

The apparatus 20 of FIG. 1 comprises an elongated chamber 21 having a main reaction chamber portion 22 thereof of substantially cylindrical shape and with a side wall having a cylindrical interior surface 23. The main reaction chamber 22 necks-down along a portion 28 to an inlet portion 24, also preferably of cylindrical interior shape, which is supported for rotation within a roller bearing means 44 supported by a block or base 45 off the floor or frame 54 supporting the apparatus. The main chamber portion 22 has a supporting ring or band 29 welded or otherwise secured to the side wall 26 thereof and is supported for rotation by means of a second roller bearing 46 which is supported by a bracket or large pillow block 47 also secured to frame 54. Thus, the reaction chamber 21 may be rotated about its longitudinal axis which is preferably substantially horizontal. The end of the necked-down portion 24 of the reaction chamber 21 is open at 25 and extends into a plenum or chamber 34 which is supported and remains stationary during the rotation of 21. A rotary seal 42 is provided between the outside wall of 24 and the opening 35 in chamber 34 so that a fluid seal is effected between the interior volume 34' of 34 and the volume defined by the tubular section 24 for the flow of heat transfer fluid between the two. One or more inlet lines, such as pipe 56, are connected to the wall of chamber 34 for flowing a fluent or liquid material thereto for admitting said material to the annular volume 43 defined by tubular section 24 and a centrally disposed conduit member 30 which projects into the main reaction chamber 22. Inlet line 56 is connected to a pressurized source of heat transfer fluid such as a controllable pump for flowing liquid into the chamber 22.

The chamber assembly 21 is rotated while the plenum 34 is fixedly supported on a mount 41 and conduit 30 is supported by an end wall 40 of 34 and a mount or stand 39 situated behind the plenum. The conduit 30 contains one or more passageways extending therethrough or pipes for conducting one or more fluids to be sprayed to a spray nozzle or other device 30P shown secured at the end of conduit 30. Member 30 may also contain other devices such as electrical wires or cable for operating or positioning device 30P, regulating the flow of fluids from 30 into the reaction zone measuring process variables or rotationally distributing particulate material into the wall 36' of liquid travelling along cylindrical wall 21.

Rotation of the chamber 21 is effected by means of a variable speed controlled motor 52 having a bevel gear 50 secured to its output shaft which meshes with a bevel gear 48 axially secured to the inlet section 24 and rotatable therewith.

The exhaust end 27 of chamber 21 is open and extends into an exhaust chamber or plenum 62 adapted for receiving liquid 60 admitted through inlet 56 and flowed along the wall of the reaction chamber and/or the products of reaction which may comprise gases and/or the liquid exhausted thereto or chemicals dissolved or otherwise provided in the liquid. The end of wall 26 is shown outwardly flared at 26' and a rotary seal 67 is provided between wall 26 of the rotating chamber and the front wall 63 of the plenum 62. One or more inlet lines 65 to chamber 62 are provided for admitting one or more fluids to the volume 64 bounded thereby which may be used to react with the fluids exhausted thereto. The exhaust fluid 60 may comprise a liquid such as water used primarily for heat transfer purposes as described.

In one form of the invention, molten metal, glass, polymer or other material may be pumped or flowed by gravity from a reservoir (not shown) thereof into the conduit 30 at a constant, regulated rate and ejected as a conical spray from the spray nozzle 30P into the cylindrical wall 36' of water or other liquid. The particles which at least partially solidify as soon as they enter liquid 36', are carried therewith to the exhaust end 27 of chamber 21.

In another form of the invention, device 30P may comprise a burner, plasma arc generator or other source of heat operative to liquify or provide in a semi-molten condition and spray material fed thereto as a rod or other shape such as particles of said material which are fed through the conduit 30. Various materials which may not easily be made molten may thus be introduced through an inlet line 32 to conduit 30 through which said materials flow to a source of suitable heat at the end 31 thereof which causes same to melt or otherwise form particles and which ejects same as a constant flow of one or more streams into the wall 36' of heat transfer liquid. Such particles may be formed per se in the apparatus of FIG. 1 or may be used to chemically react with the liquid defining wall 36' or a chemical therein for providing new compounds.

The depth of the wall of liquid will be a function of the volume rate of flow of said liquid and the rotational velocity of the chamber. If conduit 30 is centrally disposed within chamber 21 as illustrated and the device 30P is a burner, plasma arc generator or other point source of heat or radiation substantially all the liquid flowing past said device 30P will be subject to the same flow of particles so as to provide means for effecting a controlled process and particle formation.

Other features of the embodiment illustrated in FIG. 1 include the provision of a frusto-conical deflector 49 for the liquid 60 flowing from inlet conduit 24 to guide said liquid along the wall of the outwardly expanding section 28. Notation 60' refers to a portion of the inlet liquid adapted to be flowed along that portion of conduit 30 which projects into the volume 36 which is void of the liquid 60 so as to maintain the end of conduit 30 at a desired temperature, if necessary. The operation of deflector 49 can be such that it permits liquid 60' to flow along the end of conduit 30. Vents (not shown) in the deflector 49 may be employed for this purpose.

In FIG. 1, the end 27 of chamber 21 is shown open and projects into an exhaust chamber or tank 62 adapted to receive said liquid as it flows out of said chamber 21. Said liquid and particles therein may be removed through one or more pipes 66, 66' from volume 64 by gravity or pumping means and either recirculated or flowed to storage means or the apparatus may be operated for further processing the reaction products contained in or comprising said liquid. The solid particles may be separated from the liquid by conventional means such as filtration employing a filter device 69 connected to the outlet pipe to receive the liquid and particles delivered from chamber 62.

The apparatus of FIG. 1 may be mounted for rotation about a horizontally disposed axis as illustrated or disposed in any suitable attitude including vertically disposing chamber 21 with the open end 27 downwardly or upwardly facing. Heat transfer and/or reactant liquid or vapor may also be flowed through the interior of conduit 30 for cooling same and/or partaking in the operation of device 30P located at the end of 30. If device 30P is a plasma-arc generator utilizing a liquid such as water for its operation, said water may be introduced through inlet line 32 and directed therealong through conduit 30.

Figure 2:
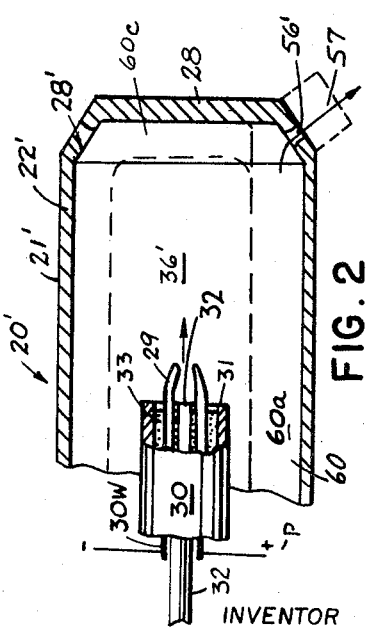
FIG. 2 is a partial view of an apparatus employing electrical discharge means including a consumable electrode or electrodes for forming particles and similar in many respects to the apparatus of FIG. 1.

In FIG. 2 is shown a modified form of the apparatus of FIG. 1. Reaction apparatus 20' of the type shown in FIG. 1 is provided with a combustion or reaction chamber 21' adapted, as described, for rotation about its longitudinal axis and having a substantially cylindrical side wall 22'. Unlike the apparatus of FIG. 1, the downstream end of the cylindrical combustion chamber 21' is closed by means of a wall 28 which prevents or restricts the flow of liquid 60 from the chamber. One or more small openings 56 may be provided in a portion 28' joining the end wall 28 and side wall 22' of the reaction chamber for permitting the flow of a reduced amount of liquid 60 from the chamber and such flow may be regulated, varied or stopped by means of a valve or valves 57 secured to wall portion 28'. The valve 57 may be remotely controllable to open and close at different times in a reaction cycle or adjusted in opening to predetermine the rate of flow of liquid from the chamber prior to operation of the apparatus. Remote control of said valve or valves during a cycle may be effected by providing a solenoid valve control or servo-motor mounted thereon and extending wires along the outside surface of the combustion chamber wall 22' to circular commutator rings which are swept by electrical brush element which are fixedly mounted, for example, on the mount 47. Thus, depending on the rotational velocity of chamber 21', the heat transfer and/or reaction liquid 60 may become disposed in depth along the bottom of the chamber as at 60a to protect the wall portions 21', 28 and 28' by constantly wetting said as the chamber rotates, or if the rotational velocity is high enough, said liquid may become disposed in depth completely around the cylindrical wall 22' including along the side and top portions thereof as at 60a and 60b as well as forming in depth along the end wall 28 as at 60c.

Also illustrated in FIG. 2 are modifications to the particle forming device, support and conduit 30. Illustrated in FIG. 2 are a plurality of electrodes 29 insulatedly mounted within member 30 on a cylindrical base 33 made of ceramic or other suitable electrical insulation. The electrodes are shown protruding from the end 31 of conduit 30 although they may be shielded or otherwise provided and may comprise consumable electrodes fed thereto operative to melt and provide droplets which are centrifugally sprayed by the rotation of conduit 30 or gas or liquid introduced into conduit 32. One or more fluids may be introduced through one or more conduits such as centrally disposed conduit 32 shown extending through the center of member 30 and exhausting between the electrodes 29 as illustrated.

The electrodes 29 are connected to a suitable source of potential by means of wires or cable 30W extending along the interior of 30 and connected to leads (not shown) extending to said potential source P. The potential source may comprise means for generating a continuous electrical spark discharge or arc across the gap between the electrodes in the reaction fluid flowing therebetween and/or means for intermittently generating high voltage spark phenomena between the electrodes which are operative to generate intense shock waves in volume 36' immediately surrounding said electrodes. Various chemical reactions may be automatically and rapidly effected in the fluids introduced through conduit member 30 and the liquid 60 as described hereafter.

Figure 3:
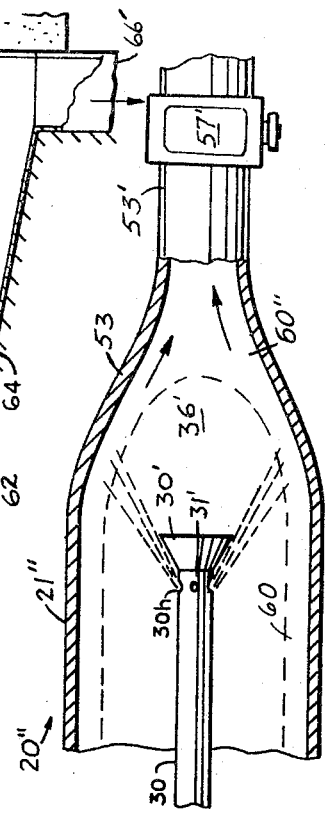
FIG. 3 is a partial view in cross section of a modified form of the apparatus of FIGS. 1 and 2.

In FIG. 3 is shown further modifications to the apparatus hereinabove described. The apparatus 20" is constructed with a cylindrical combustion chamber wall portion 21" a portion of which is shown in FIG. 3, the remainder being fabricated as shown in FIG. 1. A heat transfer liquid is caused to flow along the entire interior surface of the wall 21" and along a portion 53 thereof of reducing cross section to an extension 53' of said wall of smaller diameter than portion 21". If the volume rate of flow of liquid 60 is great enough, said liquid will completely fill the conduit extension 53' of the combustion chamber and a portion of the necked down section 53 of said chamber as illustrated by the dashed lines so that a volume 36' which is void of liquid is disposed about the end of conduit 30 and is bounded entirely by liquid in a flowing state. Hence, combustion or radiation means as heretofore described may be mounted at the ends of member 30 for creating a chemical reaction in volume 36' and/or in the liquid 60 as it flows past said combustion device. In the embodiments of the invention illustrated in FIGS. 2 and 3 the components not shown but illustrated in FIG. 1, are applicable to the apparatus illustrated and heat transfer liquid flowed over the exterior surface of the conduit 30 may cooperate with the fluid or fluids flowed through 30 to protect the latter and the radiation or burner device from the intense temperatures generated within the reaction zone. Notation 57' refers to a valve or adjustable gate disposed across 53', the extension of the chamber 21 and operative for retaining liquid and combustion products within chamber 21" or regulating the flow therethrough in accordance with process requirements. The end portion 31' of conduit 30 is shown provided with a frusto-conical deflector 30' which serves as means for deflecting fluid or fluent materials ejected through holes 30h in 30 against and into the liquid 60 formed along the wall of the chamber to be affected thereby or react therewith. For example, liquid metal flowed through conduit 30 from a furnace or liquified at the end of 30 or 30' by means of a burner or plasma arc device may be ejected through the openings or nozzles 30h provided along 30 into the flowing liquid 60 for the purpose of suddenly solidifying same into particles, assuming that said metal is atomized during the ejection thereof from 30. Other chemicals in particulate or liquid form may be similarly ejected as streams or atomized droplets into the surrounding flow of liquid 60 at a steady flow rate and exhausted through section 34 after reacting with said liquid or being solidified thereby. Various chemical reactions between two fluids or particles and liquids may be effected by means of the apparatus of FIG. 3 which are effected with or without the generation of an arc, burning or other radiation means disposed at the end of 30 or 30'.

In FIGS. 2 and 3 notation 60c refers to that portion of the heat transfer liquid which has formed against the far end of the reaction chamber in its flow therefrom. In FIG. 2 the volume 36' within the reaction chamber is shown as defined by liquid 60c at one end thereof and is bounded by a wall of liquid 60a blanketed against the inside surface of the cylindrical chamber and formed by rotation of the chamber at sufficiently high velocity to maintain said wall of liquid in place against the chamber wall by centrifugal force. In FIG. 3 the liquid portion 60" flowing along the side walls is disposed inward of the necked-down exhaust duct 78 and defines a liquid end wall to the volume 36'. Thus in FIGS. 2 and 3 the volume 36' is substantially totally enclosed within a surrounding wall of liquid. In FIG. 1 as well as in the other embodiments, liquid may also be flowed over the wall of the conduit 30 as illustrated at 60' to transfer heat therefrom. Notation 49 refers to a frusto-conical deflector disposed around that portion of conduit member 30 extending beyond portion 24 and is operative to deflect liquid along the outwardly tapering portion 28 of the chamber wall.

I claim:

1. A process for making particulate material comprising:
    (a) generating a spray of molten particulate material in a 360° spray flow thereof,
    (b) generating a cylindrical wall of coolant liquid such as water and directing same to surround said spray flow of particulate material and flow therepast,
    (c) causing said particulate material to be directed into said cylindrical wall of liquid,
    (d) solidifying said particulate material in said liquid,
    (e) directing said cylindrical wall of liquid into a water body at the end of said cylindrical liquid wall which body defines an uninterrupted water surface terminating said cylindrical wall of liquid,
    (f) directing said particulate material to flow along said cylindrical liquid wall into said water body, and
    (g) separating said particulate material from said liquid.

2. Apparatus for continuously making particulate material comprising in combination:
    (a) a fluid carrying conduit,
    (b) means for admitting a liquid to said conduit,
    (c) means for rotating said conduit at an angular velocity to retain the liquid therein as a layer against the wall of said conduit,
    (d) means situated within said conduit for creating molten particles and directing said particles outwardly into the layer of liquid disposed against the wall of said conduit whereby said liquid arrests the flight of said particles,
    (e) means for flowing the liquid longitudinally along the inside wall of said conduit to carry the particles therewith, and
    (f) means for receiving said liquid and particles and separating said particles from said liquid.

3. Apparatus in accordance with claim 2 wherein said means for creating molten particles includes metal spraying means operative to spray molten metal radically outwardly in a substantially constant density about 360° of said spraying means.

4. Apparatus for continuously making particulate material comprising:
    (a) means for producing molten particles and for directing said particles outwardly about an axis,
    (b) means for generating a substantially cylindrical wall of liquid and directing said cylindrical liquid wall so as to surround and flow past said molten particle producing means and receive said outwardly directed particles,
    (c) means for containing a body of said liquid in depth at the downstream end of said cylindrical liquid wall so as to define an uninterrupted liquid surface terminating said cylindrical wall of liquid,
    (d) means for flowing said particles along said cylindrical liquid wall and into said body of liquid, and
    (e) means for collecting and separating said particles from said liquid.

5. Apparatus in accordance with claim 4, including means for flowing and recirculating said liquid from the body of liquid and flowing same to feed the upstream side of said cylindrical wall of liquid.

6. Apparatus for manufacturing particles and the like:
(a) a cylindrical container,
(b) means for admitting a first liquid to said container,
(c) means for rotating said cylindrical container about its longitudinal axis at a rotary velocity to cause said first liquid to flow against the inside surface of the side-wall of said container and to be retained thereagainst as a layer of liquid by centrifugal action,
(d) dispensing means for a second liquid,
(e) means for supporting said dispensing means within said container,
(f) said dispensing means including means for forming particles of said second liquid and causing said particles to be separately propelled outwardly from said dispensing means into said layer of said first liquid provided against the inside surface of said container,
(g) means exterior of said cylindrical container for receiving and collecting particles, and
(h) an opening in said cylindrical container communicating with receiving means permitting flow of particles between the interior of said cylindrical container and said receiving means.

7. Apparatus in accordance with claim 6 including means continuously feeding said first liquid to said cylindrical container as said container rotates at a rate of flow to maintain liquid at substantially constant depth along the inside surface of the wall of said cylindrical container.

8. Apparatus in accordance with claim 6, said cylindrical container having an end-wall for containing said first liquid within said container, and a plurality of holes in the side-wall of said container through which liquid and particles may be outwardly dispensed from said container by centrifugal action as the container rotates about its longitudinal axis.

References Cited by the Examiner

UNITED STATES PATENTS

| 2,079,111 | 5/1937 | Edgar et al. | 18—2.6 |
| 2,984,896 | 5/1961 | Hill | 264—12 |

FOREIGN PATENTS

| 677,726 | 1/1964 | Canada. |

ROBERT F. WHITE, *Primary Examiner.*

J. R. HALL, *Assistant Examiner.*